May 6, 1947.   F. D. FRISBY   2,420,039
SHAFT SEALING RING
Filed May 3, 1945
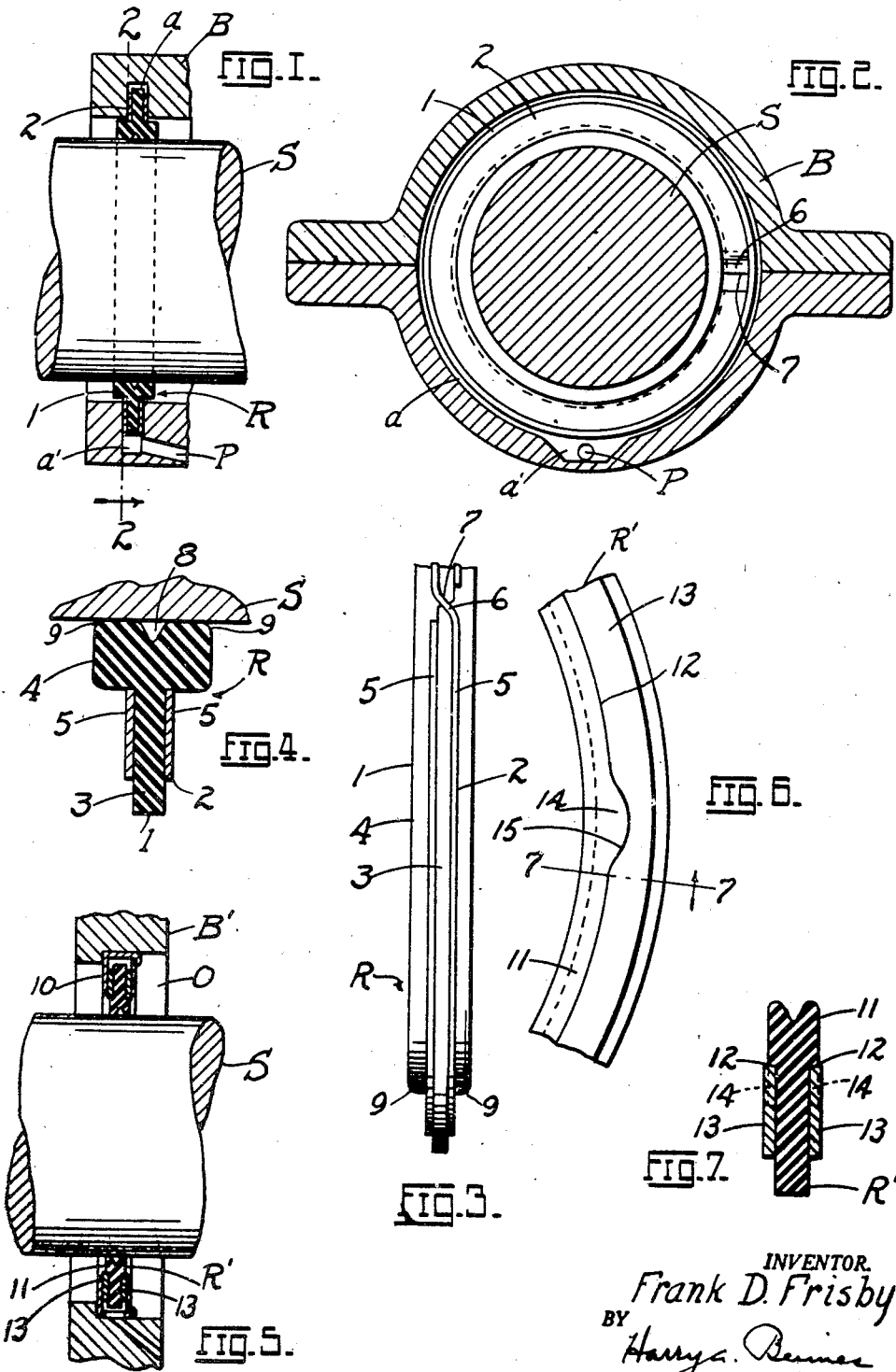
INVENTOR.
Frank D. Frisby
BY Harry C. Benner
ATTY.

Patented May 6, 1947

2,420,039

UNITED STATES PATENT OFFICE 2,420,039

SHAFT SEALING RING

Frank D. Frisby, St. Louis, Mo., assignor to Ramsey Accessories Manufacturing Corporation, St. Louis, Mo., a corporation of Missouri Application May 3, 1945, Serial No. 591,670

2 Claims. (Cl. 288—2)

My invention has relation to improvements in sealing rings and it consists in the novel features of construction more fully set forth in the specification and pointed out in the claims.

The invention is concerned primarily with a ring for sealing a shaft against leakage of oil from points where the shaft emerges from a housing, and its principal object is to form such ring of a flexible steel ring combined with a rubber component in such manner that the sealing ring will be both effective and durable. The manner of accomplishing this object, together with other advantages inherent in the invention, will be better apparent from a detailed description thereof in connection with the accompanying drawings, in which—

Figure 1 is a middle vertical section of a housing showing my improved sealing ring mounted on a shaft; Figure 2 is a vertical section taken on a plane indicated by the line 2—2 of Figure 1; Figure 3 is an edge view of the sealing ring assembly; Figure 4 is an enlarged cross section through the ring; Figure 5 is a cross section similar to Figure 1 showing a modified form of ring in a slightly different application; Figure 6 is a face view of a fragment of the modified construction; and Figure 7 is an enlarged section taken on the line 7—7 of Figure 6.

Referring to the drawings, S represents a shaft passing through a housing B in which there is an annular oil groove $a$. At the lower part of groove $a$ is one or more sumps $a'$ in which surplus oil may accumulate for draining off through a port P.

My improved oil ring R comprises a ring component 1 of rubber, or similar material, of a T-shaped cross section with the flange 3 extending outwardly from the base 4. A helical spring steel (or plastic) ring 2 having two coils 5, 5 is intimately associated with the rubber ring 1. The coils 5, 5 are spaced by a transverse portion 6 a distance slightly less than the thickness of the flange 3 and are disposed so as to embrace the sides of flange 3. A recess or slot 7 is provided at one point in the flange 3 to accommodate the transverse portion 6 of ring 2 and to form a key between component 1 and component 2. Ordinarily, the inside diameter of the ring 2 is slightly larger than the outside diameter of the base 4 of ring component 1 so as to facilitate the assembly of the ring combination.

The inside diameter of the base 4 of component 1 is slightly less than the diameter of shaft S and is provided with a V-shaped annular groove 8 (or there may be a plurality of such grooves, if desired) which serves to furnish a vacuum seal to prevent leakage of oil along the shaft. The inside edges 9, 9 of the ring component 2 are rounded (as shown in Figure 4) to facilitate the application of the ring R to the shaft S.

The groove $a$ in the housing B is slightly wider than the combined width of flange 3 and ring coils 5, 5 so that the assembled ring R will have a working clearance in the groove $a$.

When the shaft S is rotating, the ring R, of course, rotates with it and any oil that might work past the ring coils 5, 5 will be thrown centrifugally from the flange 3 into the groove and will ultimately find its way into the sump $a'$ from which it drains through port P back into the housing, or crank case, as the case may be.

In the manufacture of my improved ring R, the spring coils 5, 5 of ring 2 may be slightly less on their inside diameter than the outside diameter of the base 4 so that they would have a contracting action around the base of component 1 and thereby impose tension thereon to increase the gripping effect of the base 4 around shaft S. This tension should be of an amount that will prevent the ring R from slipping on the shaft but at the same time should permit relative longitudinal movement between the ring and shaft to insure centering of the ring in the groove $a$ should there be longitudinal movement of the shaft for self-aligning. This tension is under the control of the designer to suit the requirement of any given application.

In the modification (Figures 5, 6 and 7), the shaft S passes through a cage 10 mounted in opening O of housing B', and a modified form of ring R' is disposed in the opening O.

In the ring R', there is a rubber component 11 having circumferential offsets 12, 12 to receive oppositely disposed split rings 13, 13 each of which has lugs 14 which fit into recesses 15 formed in the offsets 12 of component 11.

Obviously, other modifications are within the purview of the skilled mechanic and I do not wish to be limited to the specific forms herein shown.

Having described my invention, I claim:

1. A sealing ring comprising an annular resilient component and a steel ring component having two ring elements in spaced relation and connected by a transverse element, said ring elements being disposed on opposite sides of the resilient component and the transverse element passing through a recess in the resilient component.

2. A shaft sealing ring comprising an integral resilient ring component of T-shaped cross-section and a thin spring ring component arranged flatwise with respect to and on each side of the medial flange portion of the T, said spring components being radially resilient so as to exert inward radial force on the resilient T-shaped component when assembled on a shaft.

FRANK D. FRISBY.

REFERENCES CITED

The following references are of record in the file of this patent:

UNITED STATES PATENTS

| Number | Name | Date |
|---|---|---|
| 2,393,779 | Hunter | Jan. 29, 1946 |
| 1,977,081 | Olsen | Oct. 16, 1934 |
| 1,986,285 | Pollitz | Jan. 1, 1935 |

FOREIGN PATENTS

| Number | Country | Date |
|---|---|---|
| 318,775 | British | 1929 |
| 321,274 | British | 1929 |
| 795,200 | French | 1936 |